United States Patent [19]

Stumpe

[11] 4,065,343

[45] Dec. 27, 1977

[54] LABEL SYSTEM FOR PACKAGE AND BAGGAGE HANDLING

[75] Inventor: Warren R. Stumpe, Glendale, Wis.

[73] Assignee: Rexnord Inc., Milwaukee, Wis.

[21] Appl. No.: 750,343

[22] Filed: Dec. 13, 1976

Related U.S. Application Data

[63] Continuation of Ser. No. 632,023, Nov. 14, 1975, abandoned.

[51] Int. Cl.² .................. B29C 17/08; B65C 11/02
[52] U.S. Cl. .................... 156/212; 209/111.7 R; 235/462; 40 2 R
[58] Field of Search ............ 40/2 R, 6, 312, 305; 209/111.5, 111.6, 111.7, 111.8, 111.9; 235/61.11 E; 156/212

[56] References Cited

U.S. PATENT DOCUMENTS

| 192,649 | 6/1877 | Howe | 40/2 R X |
| 1,472,381 | 10/1923 | Bangs | 40/2 R |
| 3,752,312 | 8/1973 | Soltanoff | 40/6 X |

FOREIGN PATENT DOCUMENTS

| 1,101,199 | 4/1955 | France | 40/2 R |
| 1,071,871 | 6/1967 | United Kingdom | 40/2 R |

OTHER PUBLICATIONS

Bendix Code Reader 102 & 103 Brochures, Bendix Corporation, Southfield, Michigan.
Bendix Model 300 Automatic Baggage Control System, Bendix Corporation, Southfield, Michigan.
Automatic Baggage Handling Article, Reprinted from Business Week, Industrial Edition, #2310, Dec. 15, 1973.
Eastern Airline Label (System for Automatic Handling) currently in use.

*Primary Examiner*—John F. Pitrelli
*Attorney, Agent, or Firm*—Sughrue, Rothwell, Mion, Zinn and Macpeak

[57] ABSTRACT

A method of handling and identifying luggage, packages, or the like comprising the steps of (1) printing characters conveying information concerning each piece of luggage on one side of a strap segment the other side of which is at least partially coated with a suitable adhesive and (2) affixing each strap segment to a piece of luggage so that the characters appear on three sides of the piece of luggage, permitting the characters to be read regardless of whether the piece of luggage is standing up or has fallen over on one of its two principal sides.

9 Claims, 9 Drawing Figures

LABEL SYSTEM FOR PACKAGE AND BAGGAGE HANDLING

This is a continuation, of application Ser. No. 32,023, filed Nov. 14, 1975, now abandoned.

BACKGROUND OF THE INVENTION

1. Field of the Invention

This invention is usable wherever information concerning objects, such as luggage, packages, and the like, must be temporarily affixed to the objects and then read during handling of the objects. It is particularly adaptable to use in luggage handling systems such as are found, or instance, at airports.

2. Description of the Prior Art

Most early attempts at automatic baggage handling systems suffered from the inability to ensure that the automatic scanners/readers would always "see" the labels or tags on the pieces of baggage as they moved along baggage conveying systems. This inability to "see" the labels or tags resulted to a great extent from the variability of bag sizes, from the variability of bag orientations which can be produced in baggage handling systems, and from the design of the standard "handle" tags, which are affixed to baggage handles by means of strings or paper seals and which do not maintain any fixed orientation of the tag faces with respect to the bags.

A partial solution to this problem is disclosed in U.S. Pat. No. 3,752,312, issued to Soltanoff. The Soltanoff invention, however, suffers from several deficiencies which limit its acceptability. These deficiencies may be enumerated as follows:

1. Soltanoff's encircling strap must be a length at least equal to the circumference of the largest bag. Since the strap material cost is directly dependent on quantity, this adds unnecessarily to baggage handling costs.

2. The equipment for tagging each bag with an encircling strap is fairly expensive. Since the equipment must be provided at a large number of check-in locations at a typical airport, the capital cost of using Soltanoff's system can be quite high.

3. The encircling strap is highly subject to breakage as a result of the mechanical and manual manipulations associated with terminal and in-aircraft baggage handling. This is particularly but not exclusively true where the shape of the baggage creates unsupported spans of strap.

OBJECTS OF THE INVENTION

The object of the present invention is to overcome or at least substantially mitigate the deficiencies of both the early automatic baggage handling systems and the Soltanoff system. Additionally, it provides several unique advantages in terms of system simplicity and overall cost reduction.

SUMMARY OF THE INVENTION

The subject invention is a method of handling baggage, packages, or the like comprising the steps of (1) printing characters conveying information concerning each piece of luggage on one side of a strap segment the other side of which is at least partially coated with a suitable adhesive and (2) affixing each strap segment to a piece of luggage so that the characters appear on three sides of the piece of luggage, permitting the characters to be read regardless of whether the piece of luggage is standing up or has fallen over on one of its two principal sides.

DETAILED DESCRIPTION OF THE PESENTLY PREFERRED METHOD

Figure 1A:
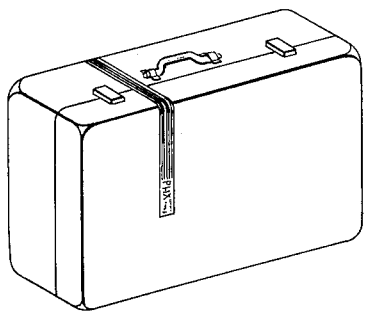
FIGS. 1a through 1c are perspective views of typical suitcases to which a coded strap segment has been affixed in the manner of the subject invention.
Figure 1B:
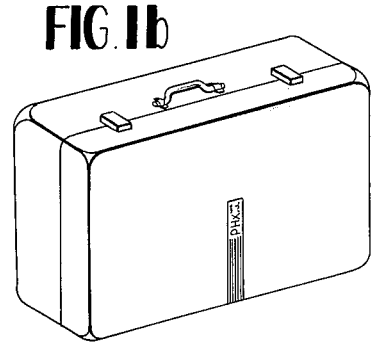
Figure 1C:
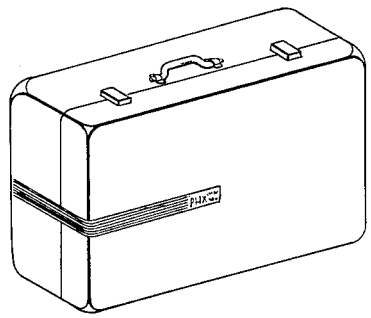
Figure 2:
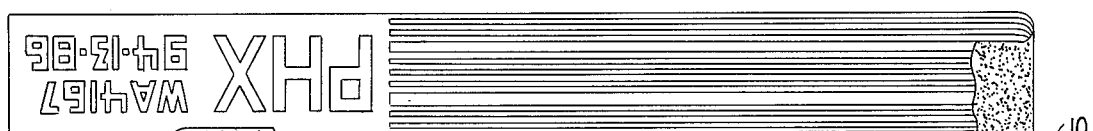
FIG. 2 shows a coded strap segment bearing both man-readable and machine-readable characters, the latter being in bar code, indicating a single destination.
Figure 3:
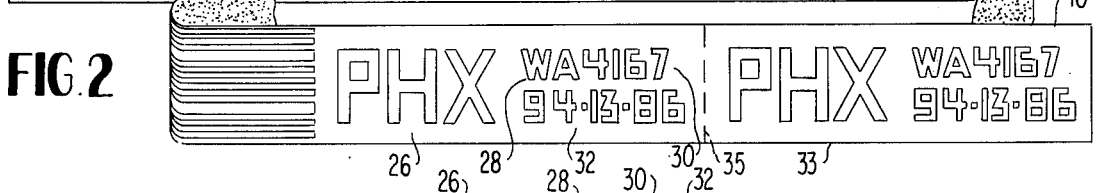
FIG. 3 shows a coded strap segment bearing both man-readable and machine-readable characters, the latter being in bar code, indicating both an ultimate destination and an intermediate transfer point.
Figure 3:
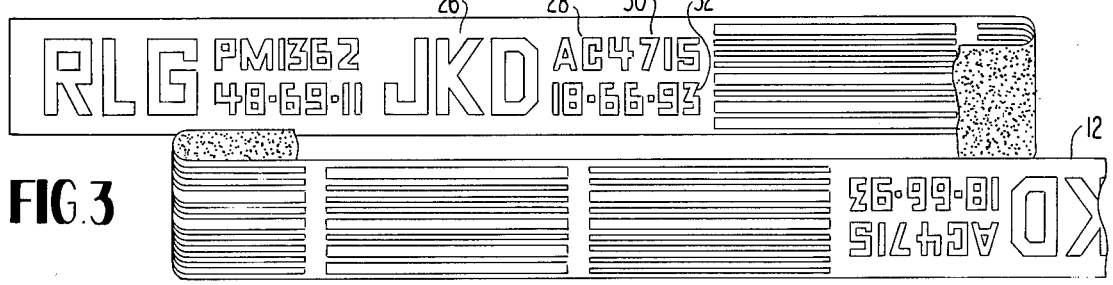
Figure 4:
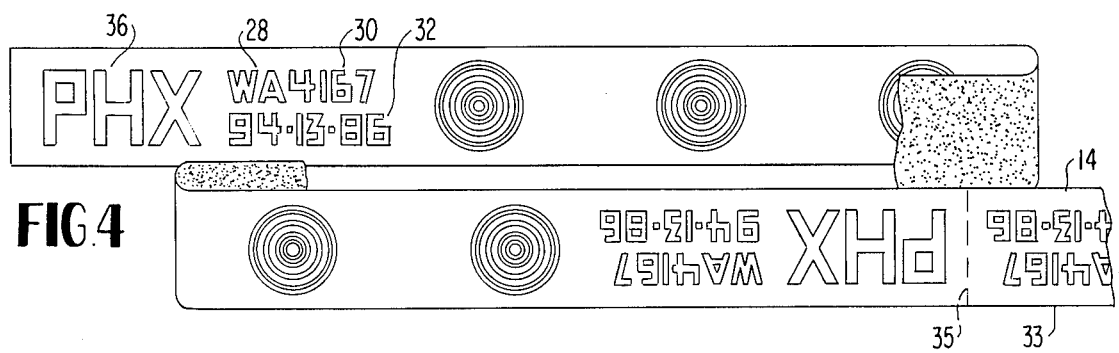
FIG. 4 shows a coded strap segment bearing both man-readable and machine-readable characters, the latter being in bull's-eye code, indicating a single destination.
Figure 6:
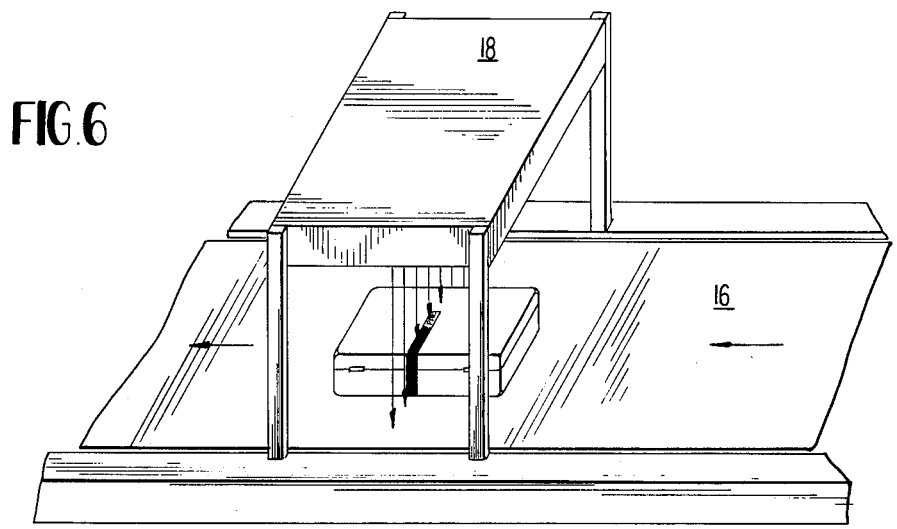
FIG. 6 is a perspective view of a conventional variable focal length, top-mounted scanner reading the coded strap segment affixed to a piece of luggage in accordance with the subject invention.
Figure 7:
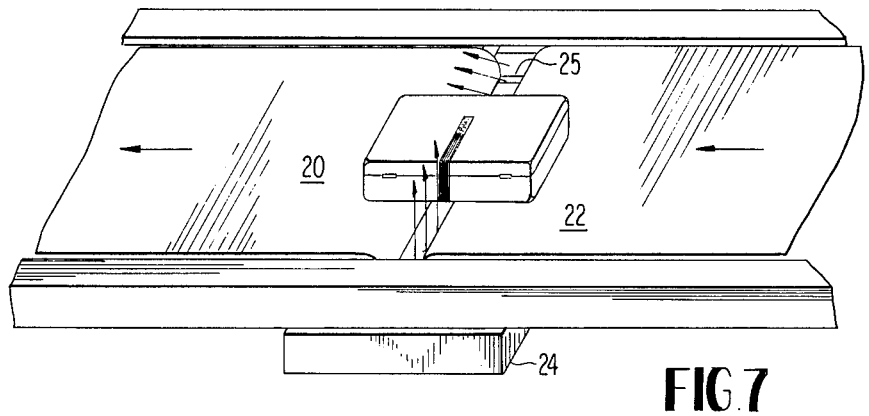
FIG. 7 is a perspective view of a conventional fixed focal length, vertically directed, bottom-mounted scanner reading the coded strap segment affixed to a piece of luggage in accordance with the subject invention (bottom part of drawing) and of a conventional variable focal length, angularly inclined, bottom-mounted scanner reading the coded strap segment affixed to a piece of luggage in accordance with the subject invention (top part of drawing).

Broadly speaking, the presently preferred method comprises the two steps: printing coded strap segments such as the strap segments 10, 12, and 14 depicted in FIGS. 2-4, respectively, and then affixing a strap segment to each piece of luggage so that the coding appears on three sides of the piece of luggage, as shown in FIGS. 1a and 1c. Of course, as used herein the term "printing" is intended to be highly generic; many different methods of printing besides traditional ink printing could be employed. After the coded strap segments are affixed to the bags, they can be handled by conventional baggage handling equipment such as the conveyor 16 and variable focal length, top-mounted scanner 18 depicted in FIG. 6, the conveyors 20 and 22 and the fixed focal length bottom scanner 24 depicted in the bottom part of FIG. 7, or the conveyors 20 and 22 and the variable focal length, angularly inclined, bottom-mounted scanner 25 depicted in the top part of FIG. 7.

The coding on the strap segments preferably consists of both man-readable characters and machine-readable characters. The machine readable characters can be in any of a variety of currently available coding systems, such as the bar code shown in FIGS. 2 and 3 or the bull's-eye code shown in FIG. 4, each of which permits omni-directional machine reading of the information contained in the coded characters. In the examples shown in FIGS. 2 and 4, the information conveyed in man-readable form consists of a destination code 26, an airline code 28, a flight number 30, and a receipt number 32. In the example shown in FIG. 3, the information conveyed in man-readable form consists of that information plus the destination code 26', airline code 28', flight number 30', and receipt number 32' for an intermediate transfer point. Of course, the machine-readable characters convey all or part of the same information in machine-readable form.

Figure 5:
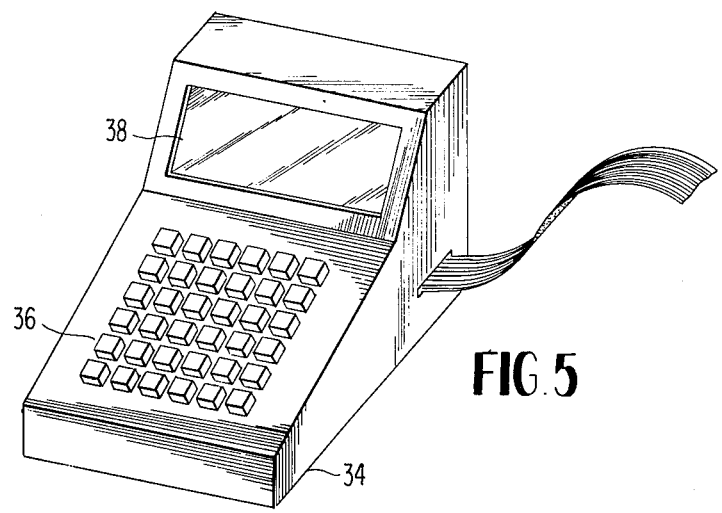
FIG. 5 is a perspective view of apparatus for encoding coded strap segments such as are shown in FIGS. 2-4.

A dispensing device 34 for the coded strap segments is shown in FIG. 5. The dispensing device 34 may be, for instance, the UPC Bar Code Printer marketed by the Industrial Tape Division of the 3M Company of St. Paul, Minnesota 55101. The keyboard 36 is used to input the desired destination, airline, and flight number, the receipt number being supplied automatically. The display screen 38 is used to allow the user of the device to check the accuracy of his input and correct it if necessary before activating a print-out means. The dispensing device 34 can be designated either to dispense strap segments of uniform length or to dispense strap segments the length of which is controlled by the operator on an item-by-item basis. In the former case, it is preferable to design the dispensing device so that the characters are printed in man-readable form at each end of the strap segments and in machine-readable form in the center portion of the strap segments; in the latter case, it is preferable to design the dispensing device so that the characters in man-readable form are alternated with the characters in machine-readable form all along the length of the straps. Preferably, the dispensing device 34 is designed so that, as shown in FIGS. 2-4, some of the man-readable characters are printed so that they are readable by a person standing on one side of the strap segments and others are printed so that they are readable by a person standing on the other side of the piece of luggage, so that the information concerning each piece of luggage can be conveniently read by a human being regardless of the orientation which the piece of luggage assumes during handling. Finally, the dispensing device 34 can be designed so that it simultaneously imprints both strap segments and receipts 33 with the same information, after which the strap segment is affixed to a piece of luggage and the receipt is given to the owner of the piece of luggage. In practice, the receipt and the strap segment are conveniently produced as a single unit separated by a perforated tear line 35, and the two components are manually separated just prior to affixing the strap segment to the luggage.

Since the hardware to provide all the foregoing functions in the dispensing device 34 is all readily available as "off-the-shelf" items, the internal design of the dispensing device 34 will not be disclosed herein.

The side of each strap segment opposite to the side on which the characters are printed is at least partially coated with an adhesive adapted to temporarily affix the strap segment to luggage without leaving marks on the luggage when the strap segment is removed. Of course, as used herein the term "adhesive" is intended to be highly generic; many different means of affixing the strap segment to the luggage besides conventional glue could be employed. The entire backside of each strap segment can be so coated, but it is preferable that it not be, both for reasons of economy and to minimize the possibility of harm to the surfaces of luggage to which the strap segments are affixed. Instead of coating the entire backside of each strap segment with adhesive, spaced portions of the backside can be so coated or, particularly where the dispensing device is designed to dispense segments of a uniform length, the adhesive can be coated on the backsides of the strap segment only adjacent to each end thereof. Normally, of course, it is simpler to precoat the material from which the strap segments are produced with the adhesive; if desired, however, the dispensing device can be designed to coat the strap segments with adhesive as they are generated. Also, the adhesive may be covered by a peel-off protective strip, or it may be directly exposed to immediate touch.

CAVEAT

While the present invention has been illustrated by a detailed description of a presently preferred method thereof, it will be obvious to those skilled in the art that various changes in form and detail can be made therein without departing from the true scope of the invention. For that reason, the invention must be measured by the claims appended hereto and not by the foregoing preferred method.

What is claimed is:

1. A method of handling and identifying articles such as luggage, packages, or the like, said method comprising the steps of:
    a. printing both man-readable and machine-readable characters conveying information concerning each article on one side of a strap segment the other side of which is at least partially coated with an adhesive adapted to allow the strap segment to be temporarily affixed to the article and subsequently to be removed in its entirety without leaving marks on the article and
    b. affixing each strap segment to the article so that the characters appear on three sides of the article, whereby the characters can be read regardless of whether the article is standing up or has fallen over on one of its two principal sides,
    wherein one set of the man-readable characters is printed so that the characters are oriented in one direction with respect to the length of the strap segment, thereby being readable by a person standing on one side of the article, and another set of the man-readale characters is printed so that the characters are oriented at 180° to the first set of characters, thereby being readable by a person standing on the other side of the article, whereby the information concerning each article can be conveniently read regardless of the orientation which the article assumes during handling.

2. A method as recited in claim 1 wherein one entire side of the strap segments are coated with adhesive.

3. A method as recited in claim 1 wherein spaced portions of one side of the strap segments are coated with adhesive.

4. A method as recited in claim 1 wherein the strap segments are all of uniform length.

5. A method as recited in claim 4 wherein only portions of the strap segments adjacent to the ends thereof are coated with adhesive.

6. A method as recited in claim 4 wherein the characters are printed in man-readable form at each end of the strap segment and in machine-readable form in the center portion of the strap segment.

7. A method as recited in claim 1 wherein the characters printed on each strap segment convey information concerning the desired destination and the routing of each article to its desired destination.

8. A method as recited in claim 7 and comprising the further step of printing characters conveying information concerning a desired intermediate transfer point for at least some of the articles on at least some of the strap segments adjacent to the characters conveying information concerning the desired destination.

9. A method as recited in claim 1 wherein the strap segment and a receipt are simultaneously printed with the same information, the receipt is subsequently separated from the strap segment, and the receipt is then given to the owner of the article.

* * * * *